United States Patent
Gupta et al.

(10) Patent No.: US 11,567,972 B1
(45) Date of Patent: Jan. 31, 2023

(54) TREE-BASED FORMAT FOR DATA STORAGE

(71) Applicant: Amazon Technologies, Inc., Seattle, WA (US)

(72) Inventors: Anurag Windlass Gupta, Atherton, CA (US); Andrew Edward Caldwell, Santa Clara, CA (US); Stavros Harizopoulos, San Francisco, CA (US); Michail Petropoulos, San Francisco, CA (US); Ramakrishna Kotla, Cupertino, CA (US); John Benjamin Tobler, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 463 days.

(21) Appl. No.: 15/199,486

(22) Filed: Jun. 30, 2016

(51) Int. Cl.
*G06F 16/22* (2019.01)
*G06F 16/25* (2019.01)
*G06F 16/28* (2019.01)

(52) U.S. Cl.
CPC ........ *G06F 16/282* (2019.01); *G06F 16/2246* (2019.01); *G06F 16/258* (2019.01)

(58) Field of Classification Search
CPC ......... G06F 17/30589; G06F 17/30327; G06F 17/30569; G06F 16/282; G06F 16/2246; G06F 16/2258
USPC ........................................................ 700/600
See application file for complete search history.

(56) References Cited

U.S. PATENT DOCUMENTS

| | | | |
|---|---|---|---|
| 6,311,252 B1 | 10/2001 | Raz | |
| 6,757,794 B2 | 6/2004 | Cabrera et al. | |
| 7,343,453 B2 | 3/2008 | Prahlad et al. | |
| 7,451,168 B1* | 11/2008 | Patterson | G06F 13/28 |
| 7,685,109 B1* | 3/2010 | Ransil | G06F 11/1446 |
| | | | 707/999.003 |
| 7,689,602 B1 | 3/2010 | Sim-Tang | |
| 8,392,400 B1* | 3/2013 | Ransil | G06F 11/1446 |
| | | | 707/716 |
| 8,443,153 B1* | 5/2013 | Edwards | G06F 11/1076 |
| | | | 711/147 |
| 8,775,411 B1* | 7/2014 | Ransil | G06F 11/1446 |
| | | | 707/716 |
| 8,850,362 B1* | 9/2014 | Khoshnevisan | G06F 16/9027 |
| | | | 715/853 |
| 9,274,710 B1* | 3/2016 | Oikarinen | G06F 3/067 |
| 9,465,836 B2* | 10/2016 | Zahn | G06F 16/245 |
| 9,609,060 B2* | 3/2017 | Kan | H04L 67/1097 |
| 2004/0064463 A1* | 4/2004 | Rao | G06F 16/9027 |

(Continued)

*Primary Examiner* — Usmaan Saeed
*Assistant Examiner* — Jessica N Le
(74) *Attorney, Agent, or Firm* — S. Scott Foster; Kowert, Hood, Munyon, Rankin & Goetzel, P.C.

(57) ABSTRACT

A tree-based format may be implemented for data stored in a data store. A table may be maintained across one or multiple storage nodes in storage slabs. Storage slabs may be mapped to different nodes of a tree. Each node of the tree may be assigned a different range of distribution scheme values which identify what portions of the table are stored in the storage slab. Storage slabs mapped to child nodes in the tree may be assigned portions of the range of distribution scheme values assigned to a parent. Storage nodes may be added or removed for storing the table. Storage slabs may be moved from one storage node to another in order to accommodate the addition or removal of storage nodes.

18 Claims, 11 Drawing Sheets

(56) References Cited

U.S. PATENT DOCUMENTS

| | | | |
|---|---|---|---|
| 2004/0078533 A1* | 4/2004 | Lee | G06F 11/1456 |
| | | | 714/E11.12 |
| 2005/0050029 A1* | 3/2005 | Suzuki | G06F 16/958 |
| 2007/0198567 A1* | 8/2007 | Van Voorhis | G06F 16/10 |
| 2012/0173515 A1* | 7/2012 | Jeong | G06F 17/30569 |
| | | | 707/718 |
| 2012/0323860 A1* | 12/2012 | Yasa | G06F 17/30156 |
| | | | 707/692 |
| 2014/0279930 A1* | 9/2014 | Gupta | G06F 11/1464 |
| | | | 707/683 |
| 2015/0142733 A1* | 5/2015 | Shadmon | G06F 16/21 |
| | | | 707/609 |
| 2015/0278397 A1* | 10/2015 | Hendrickson | G06F 16/9024 |
| | | | 707/798 |
| 2015/0281389 A1* | 10/2015 | Firsov | G06F 16/282 |
| | | | 709/214 |
| 2015/0286695 A1* | 10/2015 | Kadayam | G06F 11/10 |
| | | | 707/639 |
| 2015/0310051 A1* | 10/2015 | An | G06F 16/951 |
| | | | 707/738 |
| 2016/0055220 A1* | 2/2016 | Joshi | G06F 17/30336 |
| | | | 707/722 |
| 2016/0070480 A1* | 3/2016 | Babu | G06F 3/0638 |
| | | | 711/114 |
| 2016/0154834 A1* | 6/2016 | Friedman | G06F 16/86 |
| | | | 707/657 |
| 2016/0239384 A1* | 8/2016 | Slik | G06F 16/22 |
| 2017/0039137 A1* | 2/2017 | Mukherjee | G06F 3/067 |
| 2017/0060898 A1* | 3/2017 | Lu | G06F 16/2246 |
| 2017/0177652 A1* | 6/2017 | Danilov | G06F 3/0608 |

* cited by examiner

TREE-BASED FORMAT FOR DATA STORAGE

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information. New technologies more and more seek to reduce both the complexity and storage requirements of maintaining data while simultaneously improving the efficiency of data storage and data management.

Different data formats may be implemented to optimize the performance of storage systems. For instance, by implementing a data format that locates data commonly accessed together, access performance for the data may be increased. In another example, a data format may sort or order data according to a particular scheme (e.g., by time) so that attempts to access data in a certain range (within the scheme) may be quickly located. Because different data formats may optimize some performance features over others, data formats can become specialized depending on the type of data stored or the way in which data is utilized. Data formats that are adaptable, preserving or improving multiple performance features are desirable in order to prevent costly changes from one data format to another or to reduce the cost of other operations performed to maintain a data format. For example, adding or reducing the number of storage locations (e.g., storage systems, servers, or nodes) may result in redistributing a large portion of the data in order to maintain locality or sorting data formats.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of a tree-based format for data storage are described herein. Data stores may implement a data storage format that provides certain performance benefits. For example, for a data storage format that locates table rows of a table by a particular column, commonly used to join or group, may locate table rows likely to be accessed together in a same location (e.g., on a same storage node or device). In this way, when access requests based on the column are processed, the data likely to be accessed is likely grouped together, improving the performance of accessing data. While such a data storage format may be efficient when processing access requests, adding new data or changing the number and/or locations of storage may require redistribution of the data, which increases the cost of adding new data or changing the number and/or locations of storage. A tree-based format for data storage may maintain portions of data in storage slabs that are easily added to or redistributed allowing for the preservation of locality for commonly accessed data without increasing the performance costs of adding new data or changing the number and/or locations of storage.

Figure 1:
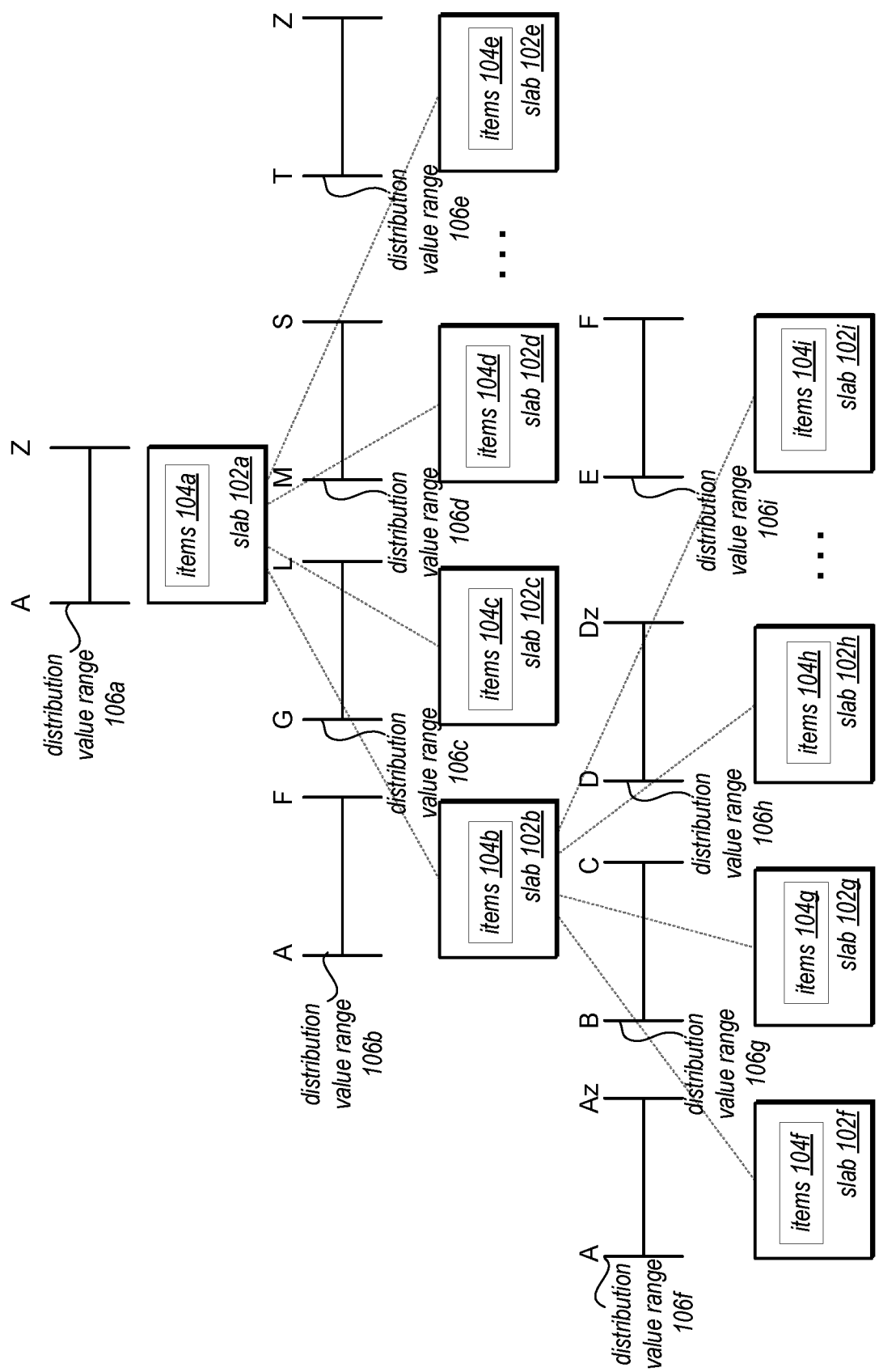
FIG. 1 illustrates a logical block diagram of a tree-based format for data storage, according to some embodiments.

FIG. 1 illustrates a logical block diagram of a tree-based format for data storage, according to some embodiments. A data store, such as a database system, data warehouse, data archive, data object store or any other form of data storage may organize data in a tree-based data format. Data, such as a table of items (e.g., rows including different field values for different columns), may be stored in storage slabs. Rows or other items of a table may be grouped into collections stored in a storage slab, like items 104 stored in storage slab 102. Slabs 102 may be treated as an atomic unit for mapping items 104 to storage locations. For example, by treating a slab as an atomic mapping unit, the responsibility for processing access requests directed to items 104, such as items 104a, within a slab 102, such as slab 102a, may be directed to or handled by a storage node hosting or storing the slab 102. Though the assignment of slabs to storage nodes may change (e.g., as a result of increasing or decreasing the number of storage nodes in a storage cluster), the responsibility for processing access requests to a slab may be moved as the slab is moved without the need to change the distribution of data within the slab. In this way, data locality may be preserved allowing for techniques, such as zone mapping to be maintained irrespective of the change in location of the storage slab.

Items 104 may be assigned to rows according to a distribution scheme that utilizes different ranges of distribution values. For example, as illustrated in FIG. 1, slab 102a may be assigned to distribution value range (e.g., distribution values A through Z). Therefore items added to a table may be stored in slab 102a that have distribution values within the assigned distribution value range. Slabs 102, however, are not unlimited in storage capacity. Slabs 102 may have space to store a limited number of items in the slab. When, for example, a storage slab 102 becomes full, then additional child slabs of the full storage slab may be created and mapped according to a tree format. For instance, when storage slab 102a became full, then storage slabs 102b, 102c, 102d through 102e may be created. The ranges of distribution values assigned to the nodes of the tree may be divided, split, or otherwise determined resulting in a disjointed partition of the range of the parent node (e.g., slab 102a). For example, storage slab 102b has a range 104b including distribution values A through F, storage slab 102c has a range 104c including distribution values G through L, storage slab 102d has a range 104d including distribution values M through S, and storage slab 102e has a range 104e including distribution values T through Z. When a storage slab in this second level of storage slabs in the tree becomes full, then an additional level of storage slabs may be created for the full storage slab (e.g., storage slabs 102f, 102g, 102h through 102i) and the distribution value ranges may be split again (e.g., range 106f, including values A through Az, range 106g, including values B through C, range 106h, including values D through Dz, and range 106i, including values E through F).

Note that full storage slabs may still retain the items 104 after new storage slabs at child nodes are created. Thus, when processing an access request for specific data with a distribution value that falls within ranges of multiple different slabs, each of the storage slabs with a range inclusive of the distribution value may be identified and searched, processed, or otherwise access to service the access request.

A distribution scheme for assigning items to storage slabs may be implemented in many ways. For example, in at least some embodiments, a hash function may be applied to a specified value for each item (e.g., a specified column) that generates a hash value based on the column. The item may then be placed into the slab that is mapped to a range of hash values that includes the hash value. Various other types of distribution schemes, such as range partitioning or wrap-around range partitioning based on one or a composite of field (e.g., column) values may be implemented, and thus the previous example is not intended to be limiting. By applying a consistent distribution scheme for assigning items to slabs, the locality of data that is commonly accessed together (e.g., when performing hash joins) may be preserved.

The number of storage slabs implemented to store a table may be variable. For example, the size of items within a table may determine how many items can be stored in a storage slab (e.g., larger rows may allow for a smaller number of rows stored in a storage slab). Additionally, the number of items in a slab is also variable. For instance, a storage slab mapped to a root node (or other higher level node) may store fewer items than a storage slab mapped to a leaf node (or other lower level node). In some cases, smaller tables with fewer number of storage slabs may also have slabs that store fewer items. Allowing for variably sized storage slabs may keep slab storage overhead efficient (as storage locations, such as storage nodes, may store a storage slab and any ancestors of the storage at the same storage location). Variably sized storage slabs may also allow for incremental size changes to the number of storage locations, such as the number of storage nodes in a storage cluster, to be as efficient as possible.

In at least some embodiments, the rate or number of new storage slabs created when a storage slab becomes full may be geometric. In this way, the items assigned to the storage slabs may still maintain locality (e.g., to permit local hash joins at storage locations). For example, 16 storage slabs may be created each time a parent storage slab is full (as powers of 2 may be efficient, easy to track, and scale well for large tables). The slab growth rate may be configurable, and could be defined by data store clients or operators as necessary.

Because storage slabs are maintained based on a tree format, the number of slabs for a table may increase as the table grows. Once a new set of storage slabs corresponding to child leaves are added, new items may be added to the new storage slabs mapped to leaf nodes. Items may be deleted, however, from any storage slab. In some embodiments, items may be stored within a storage slab according to a sort order, as discussed below with regard to FIG. 5. In at least some embodiments, the slab count for a table may not be decreased (even if items are deleted).

Mapping information may be maintained for a data store that identifies the storage locations of storage slabs in a data store. For example, as discussed below with regard to FIGS. 3-6, a table may be maintained in a storage cluster for processing access requests to the table (e.g., adding, deleting, or modifying items of the table). Mapping information may be utilized in order to process access requests and may be updated when changes to the storage locations or storage slabs are performed, as discussed below with regard to FIGS. 7-10.

Storage slab assignments may be performed in order to further improve the efficiency of providing access to the table. For example, in some embodiments, the ancestors (e.g., parent node, parent node of the parent node, and so on until the root node is reached) may be mapped to the same storage location of a storage slab that is a leaf node of the tree. When storage space is available, sibling storage slabs (e.g., storage slabs that are leaf nodes with the same parent node) may be stored in the same storage location. Multiple copies of some slabs (e.g., the root node or higher level nodes) may be stored, in some embodiments. In scenarios where the table is small and multiple storage locations are available to store storage slabs, storage slabs may be mapped to multiple storage locations, in order to provide locality (e.g., hash joins) when processing access requests.

Distributed data stores (e.g., multiple storage locations implemented on separate storage systems, components, devices or other storage nodes) may be mapped to multiple storage nodes. When resizing the number of storage locations, storage slabs can be moved or copied from one storage node to another. For example, when a storage node is added, a subset of the storage slabs on current member storage nodes to the new storage node. In another example, when a storage node is removed, the storage slabs maintained at the removed storage node may be redistributed among the remaining storage nodes.

Different mapping schemes for storage slabs to storage locations may be implemented. For example, contiguous ranges of distribution values may be mapped to a storage location. In another example mapping scheme, a consistent hashing (or similar technique) that selects a consistent set of storage slabs to map from storage nodes to other storage nodes. In some scenarios where the number of storage locations may exceed the number of storage slabs, different replication factors may be selected. A space minimizing choice would place each storage slab on a storage location, leaving some storage locations with no slabs for that table. This reduces the parallelism to the number of storage slabs, rather than the number of storage locations (e.g., since the table may be very small relative to the number of storage locations). In another example, frequently accessed storage slabs (e.g., in hash joins) can be replicated to multiple storage locations.

Please note that the previous description of a tree-based format for data storage is a logical illustration and thus is not to be construed as limiting as to the implementation of a tree, distribution scheme, and/or number of size of storage slabs that maintain data in a data store.

This specification begins with a general description of a provider network that implements data storage services that store data in tree-based formats. Then various examples of a data storage service, such as a data warehouse service, including different components/modules, or arrangements of components/module that may be employed as part of implementing the storage service are discussed. A number of different methods and techniques to implement tree-based format for data storage are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
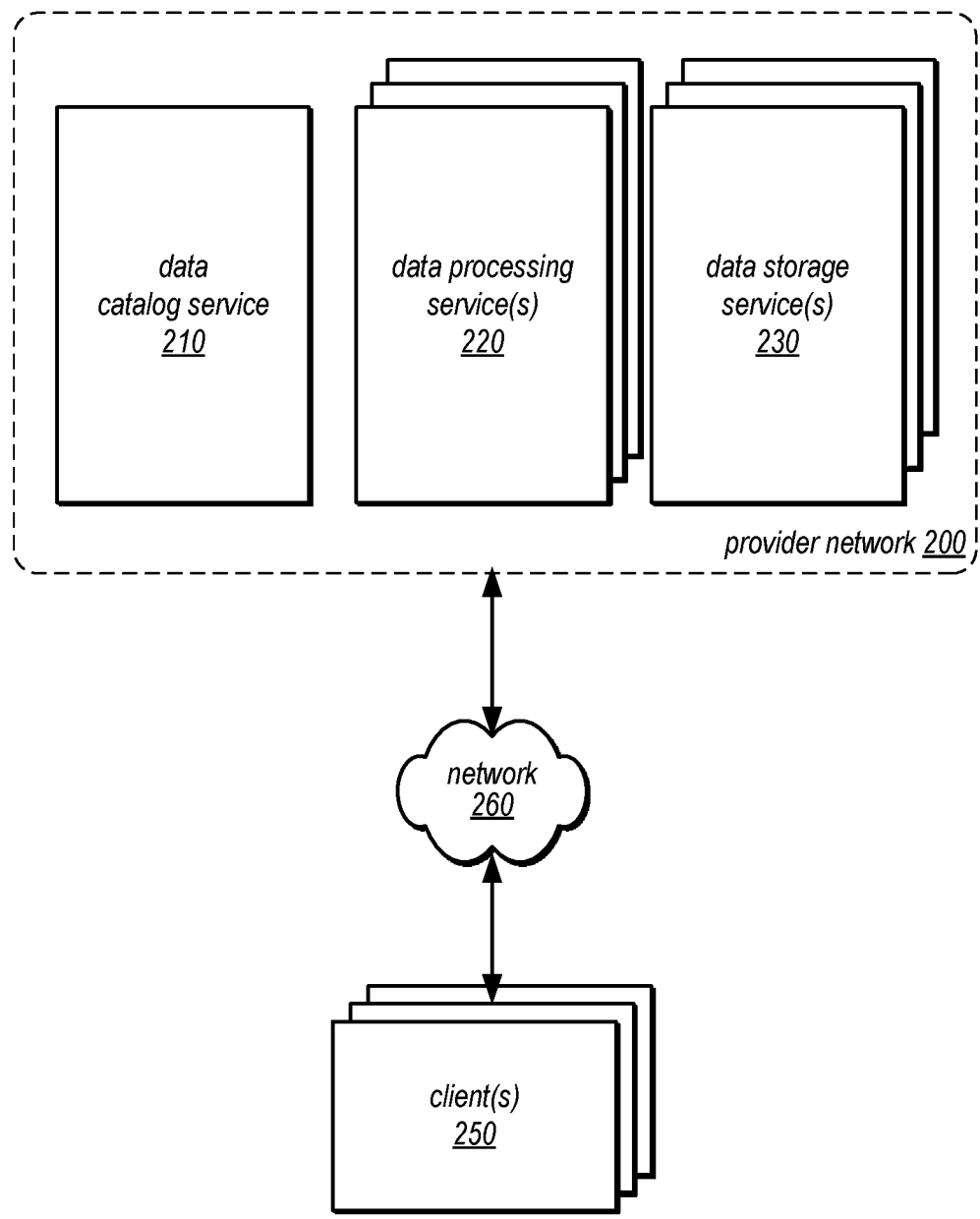
FIG. 2 is a block diagram illustrating a provider network offering data storage services that implement a tree-based format for data storage, according to some embodiments.

FIG. 2 is a block diagram illustrating a provider network offering data storage services that implement a tree-based format for data storage, according to some embodiments. Provider network 200 may be a private or closed system or may be set up by an entity such as a company or a public sector organization to provide one or more services (such as various types of cloud-based storage) accessible via the Internet and/or other networks to clients 250. Provider network 200 may be implemented in a single location or may include numerous data centers hosting various resource pools, such as collections of physical and/or virtualized computer servers, storage devices, networking equipment and the like (e.g., computing system 2000 described below with regard to FIG. 11), needed to implement and distribute the infrastructure and storage services offered by the provider network 200. In some embodiments, provider network 200 may implement various computing resources or services, such as a virtual compute service, data catalog services 210, data processing service(s) 220, (e.g., map reduce and other large scale data processing services), and data storage services 230 (e.g., object storage services, block-based storage services, or data warehouse storage services), and/or any other type of network based services (which may include various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 11 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Data catalog service 210 may provide a storage service that ingests, locates, and identifies data stored on behalf of clients in provider network 200 across the various data storage services 230. For example, a database stored in a non-relational database format may be identified along with container storing objects in an object-based data store as both being stored on behalf of a same customer of provider network 200. In at least some embodiments, data catalog service 210 may direct the transformation of data ingested in one data format into another data format, like the tree-based format discussed above with regard to FIG. 1. For example, data may be ingested into a data storage service 310 as single file or semi-structured set of data (e.g., JavaScript Object Notation (JSON)). Data catalog service 210 may be configured to identify the data format of the single file or semi-structured set of data and direct the creation of a table stored in storage slabs mapped to a tree as discussed above. In at least some embodiments, the data stored in another data format may be converted to the tree-based format as part of a background operation (e.g., to discover the data type, column types, names, delimiters of fields, and/or any other information to construct the table).

Data processing services 220 may be various types of data processing services to perform different functions (e.g., anomaly detection, machine learning, querying, or any other type of data processing operation). For example, in at least some embodiments, data processing services 220 may include a map reduce service that creates clusters of processing nodes that implement map reduce functionality over data stored in one of data storage services 230.

Data storage service(s) 230 may implement different types of data stores for storing, accessing, and managing data on behalf of clients 250 as a network-based service that enables clients 250 to operate a data storage system in a cloud or network computing environment. For example, data storage service(s) 230 may include various types of database storage services (both relational and non-relational) for storing, querying, and updating data. Such services may be enterprise-class database systems that are highly scalable and extensible. Queries may be directed to a database in data storage service(s) 230 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. Data storage service(s) 230 may also include various kinds of object or file data stores for putting, updating, and getting data objects or files. Such data storage service(s) 230 may be accessed via programmatic interfaces (e.g., APIs) or graphical user interfaces. Data storage service(s) 230 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In at least some embodiments, one of data storage service(s) 230 may be a data warehouse service. A data warehouse service as discussed below may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system. However, various versions of the components discussed below as related to storing data in a tree-based data format may be equally configured or adapted to implement embodiments for various other types of relational database systems, such as row-oriented database systems. Therefore, the following examples are not intended to be limiting as to various other types or formats of relational database systems.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data). For example, for database operations that only need to access and/or operate on one or a small number of columns at a time, less memory space may be required than with traditional row-based storage, since only data blocks storing data in the particular columns that are actually needed to execute a query may be retrieved and stored in memory. To increase the efficiency of implementing a columnar relational database table, a sort order may be generated and applied so that entries in the database table are stored according to the sort order. When queries are received, mapping information, such as may be maintained in a superblock as discussed below may be utilized to locate the data values likely stored in data blocks of the columnar relational database table, which may be used to determine data blocks that do not need to be read when responding to a query.

As discussed above, various clients (or customers, organizations, entities, or users) may wish to store and manage data using a data management service. Storage clusters, such as those discussed below with regard to FIGS. 3 and 6 may respond to store requests (e.g., to write data into storage) or queries for data (e.g., such as a Server Query Language request (SQL) for particular data), along with many other data management or storage services. Multiple users or clients may access a storage cluster to obtain data warehouse services. In at least some embodiments, a data warehouse service may provide network endpoints to of the clusters which allow the clients to send requests and other messages directly to a particular cluster. As noted above, network endpoints, for example may be a particular network address, such as a URL, which points to a particular cluster. For example, a client 250 may be given the network endpoint "http://mycluster.com" to send various request messages to. Multiple clients (or users of a particular client) may be given a network endpoint for a particular cluster. Various security features may be implemented to prevent unauthorized users from accessing the clusters. Conversely, a client may be given network endpoints for multiple clusters.

Storage clusters hosted by the data warehouse service may provide an enterprise-class database query and management system that allows users to scale the clusters, such as by sending a cluster scaling request to a cluster control interface implemented by the network-based service. Scaling clusters may allow users of the network-based service to perform their data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently.

Generally speaking, clients 250 may encompass any type of client configurable to submit network-based requests to provider network 200 via network 260, including requests for storage services (e.g., a request to create, read, write, obtain, or modify data in data storage service(s) 230, etc.). For example, a given client 250 may include a suitable version of a web browser, or may include a plug-in module or other type of code module configured to execute as an extension to or within an execution environment provided by a web browser. Alternatively, a client 250 may encompass an application such as a database application (or user interface thereof), a media application, an office application or any other application that may make use of storage resources in data storage service(s) 230 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with provider network 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 may be configured to provide access to provider network 200 to other applications in a manner that is transparent to those applications. For example, client 250 may be configured to integrate with an operating system or file system to provide storage on one of data storage service(s) 230 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 230 may be coordinated by client 250 and the operating system or file system on behalf of applications executing within the operating system environment.

Clients 250 may convey network-based services requests (e.g., access requests directed to data in data storage service(s) 230, operations, tasks, or jobs, being performed as part of data processing service(s) 220, or to interact with data catalog service 210) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
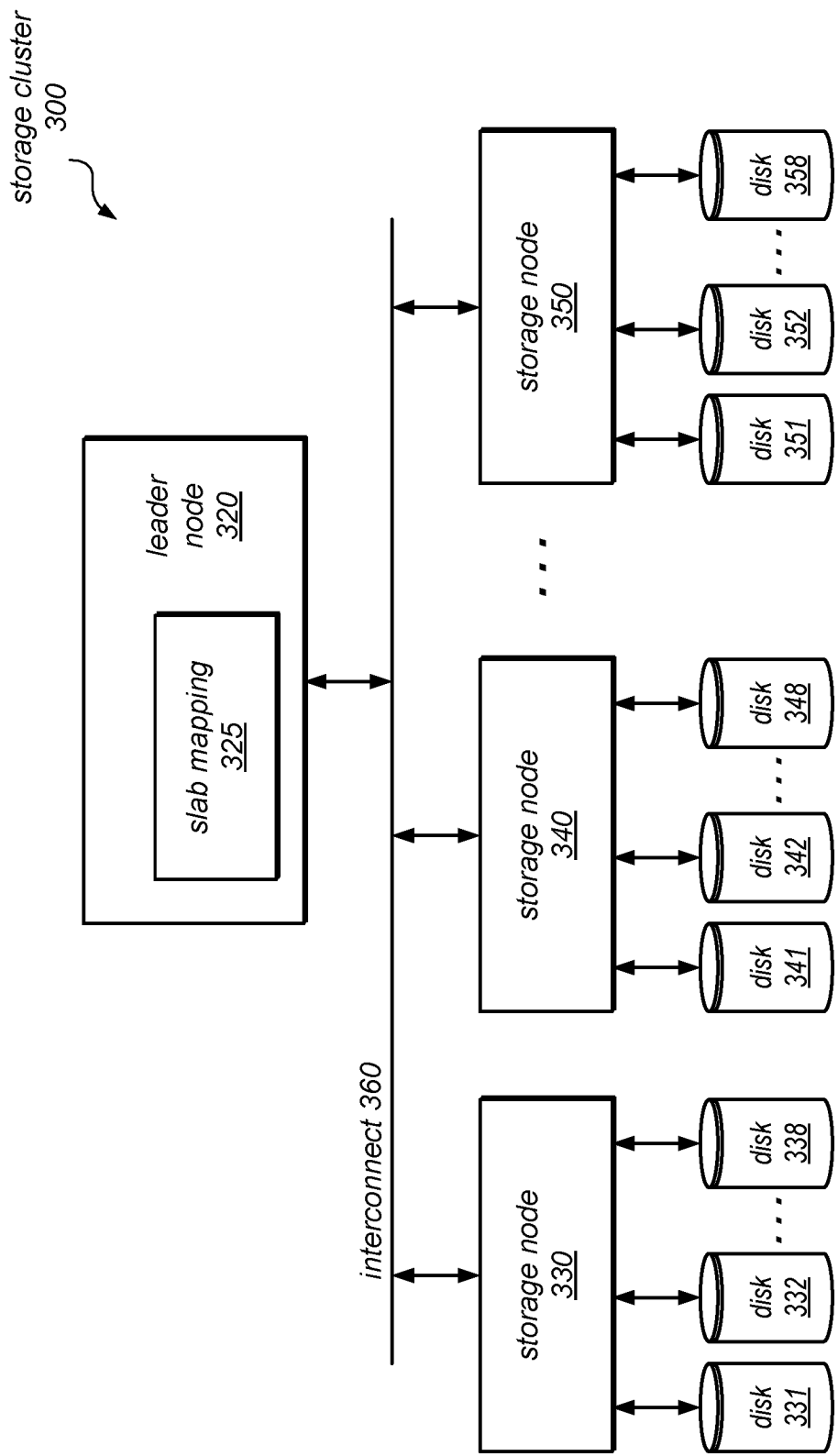
FIG. 3 is a block diagram illustrating an example storage cluster for a data storage service, according to some embodiments.

FIG. 3 is a block diagram illustrating an example storage cluster for a data storage service like a data warehouse service discussed above, according to some embodiments. As illustrated in this example, a storage cluster 300 may include a leader node 320 and storage nodes 330, 340, and 350, which may communicate with each other over an interconnect 360. Leader node 320 may maintain slab mapping information 325 for executing queries on storage cluster 300. For instance, slab mapping information may be used to identify which storage nodes may store a storage slab. As described herein, each node in a storage cluster may include multiple disks on which storage slabs of a table may be stored on behalf of clients (e.g., users, client applications, and/or storage service subscribers). In this example, storage node 330 includes disks 331-338, storage node 340 includes disks 341-348, and storage node 350 includes disks 351-358. In some embodiments, a component of the storage cluster (or the data warehouse system of which it is a component) may support load balancing, using any of a variety of applicable load balancing techniques. For example, in some embodiments, leader node 320 may include a load balancing component (not shown).

Note that in at least some embodiments, query processing capability may be separated from storage nodes, and thus in some embodiments, additional components may be implemented for processing queries. Additionally, it may be that in some embodiments, no one node in storage cluster 300 is a leader node as illustrated in FIG. 3, but rather different nodes of the nodes in storage cluster 300 may act as a leader node or otherwise direct processing of queries to data stored in storage cluster 300. While nodes of storage cluster may be implemented on separate systems or devices, in at least some embodiments, some or all of storage cluster may be implemented as separate virtual nodes or instance on the same underlying hardware system (e.g., on a same server).

In at least some embodiments, storage cluster 300 may be implemented as part of a data storage service, such as data storage service(s) 230 described above, and includes a leader node 320 and multiple storage nodes, such as storage nodes 330, 340, and 350. The leader node 320 may manage communications with storage clients, such as clients 250 discussed above with regard to FIG. 2. For example, a leader node may be a server that receives requests from various client programs (e.g., applications) and/or subscribers (users), then parses them and develops an execution plan (e.g., query plan(s)) to carry out the associated database operation(s)). More specifically, leader node 320 may develop the series of steps necessary to obtain results for complex queries and joins. Leader node 320 may also manage the communications among storage nodes 330 through 350 instructed to carry out database operations for data stored in the storage cluster 300. For example, compiled code may be distributed by leader node 320 to various ones of the storage nodes 330 to 350 to carry out the steps needed to perform queries, and intermediate results of those queries may be sent back to the leader node 320. Leader node 320 may receive data and query responses or results from storage nodes 330, 340, and 350. A database schema and/or other metadata information for the data stored among the storage nodes, such as the data tables stored in the cluster, may be managed and stored by leader node 320.

Storage cluster 300 may also include storage nodes, such as storage nodes 330, 340, and 350. These one or more storage nodes (sometimes referred to as compute nodes), may for example, be implemented on servers or other computing devices, such as those described below with regard to computer system 2000 in FIG. 11, and each may include individual query processing "slices" defined, for example, for each core of a server's multi-core processor. Storage nodes may perform processing of database operations, such as queries, based on instructions sent to storage nodes 330, 340, and 350 from leader node 320. The instructions may, for example, be compiled code from execution plan segments and steps that are executable by the particular storage node to which it is sent. Storage nodes may send intermediate results from queries back to leader node 320 for final aggregation. Each storage node may be configured to access a certain memory and disk space in order to process a portion of the workload for a query (or other database operation) that is sent to one or more of the storage nodes 330, 340 or 350. Thus, storage node 330, for example, may access disk 331, 332, up until disk 338.

Disks, such as the disks 331 through 358 illustrated in FIG. 3, may be may be implemented as one or more of any type of storage devices and/or storage system suitable for storing data accessible to the storage nodes, including, but not limited to: redundant array of inexpensive disks (RAID) devices, disk drives or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store columnar database tables through various column-oriented database schemes.

In some embodiments, each of the storage nodes in a storage cluster may implement a set of processes running on the node server's (or other computing device's) operating system that manage communication with the leader node, e.g., to receive commands, send back data, and route compiled code to individual query processes (e.g., for each core or slice on the node) in order to execute a given query. In some embodiments, each of compute nodes includes metadata for the blocks stored on the node. In at least some embodiments this block metadata may be aggregated together into a superblock data structure, which is a data structure (e.g., an array of data) whose entries store information (e.g., metadata about each of the storage slabs and data blocks stored on that node (i.e., one entry per data block). In some embodiments, each entry of the superblock data structure includes a unique ID for a respective block or storage slab, and that unique ID may be used to perform various operations associated with data block or storage slab. In at least some embodiments, an entry in the superblock may be maintained that indicates the range, such as the min and max values, for sort order values associated with the items stored in storage slabs and described in the superblock.

Figure 4:
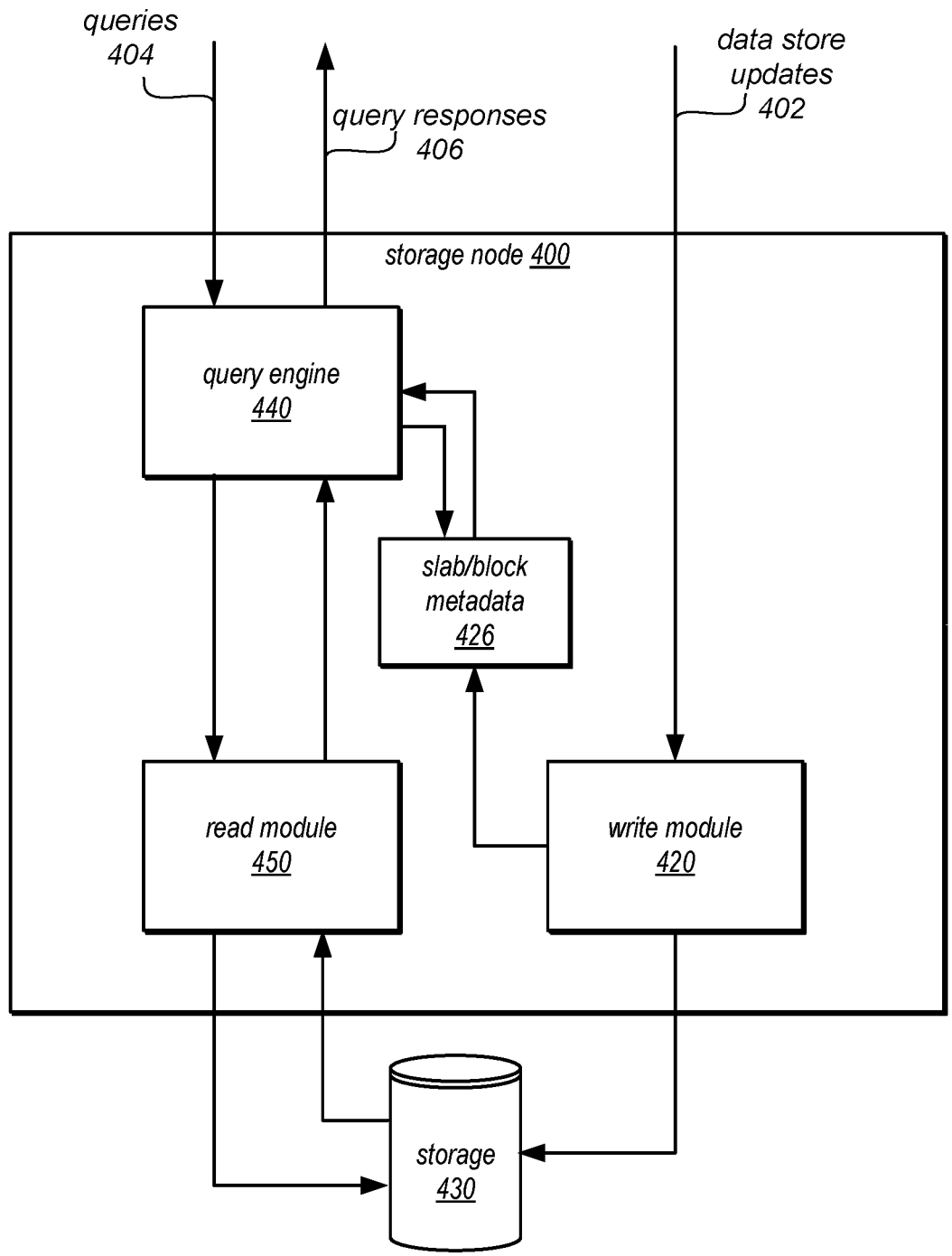
FIG. 4 is a block diagram illustrating an example storage node that processes access requests for data stored in a tree-based format, according to some embodiments.

FIG. 4 is a block diagram illustrating an example storage node that processes access requests for data stored in a tree-based format, according to some embodiments. As discussed above, a storage node may be configured to receive access requests, such as queries, storage operations, and other data management operations. Queries 404 and data store updates 402, or indications of queries or data store requests, may be received as inputs to storage node 400. Storage node 400 may communicate with storage 430, which may store a plurality of data blocks for multiple columns of a columnar database table. Data for the multiple columns may be stored in the data blocks in storage 430, and storage node 400 may be configured to both store this data and read this data from storage.

Data store updates 402 which may include data to be stored for a columnar relational database table stored in storage 430. For example, the data for storage in a data block in storage 430 may be obtain the data via an Open Database Connectivity (ODBC) and/or Java Database Connectivity (JDBC) driver interface or other component that is configured to receive storage request information and data for storage (e.g., a request to create a relational database table in the data warehouse service). Write module 420 which may subsequently store the entries in storage 430 (e.g., in a storage slab identified for the entries according to a distribution value determined for the entries). Slab/block metadata 426 may be aggregated metadata for the blocks or slabs in storage 430, such as the superblock data structure described above. In some embodiments, slab/block metadata 426 may include a cached copy or version of slab mapping data 325, discussed above, in order to allow storage node 400 to identify the location of data at other storage nodes in a storage cluster based on the assignment of storage slabs to the other storage nodes in slab mapping data 325 (e.g., in order to copy or transfer a storage slab to another storage node). Write module 420 may store sort order value ranges for data blocks as part of slab/block metadata 426. Alternatively, in some embodiments, slab/block metadata 426 may be distributed in different locations for different blocks, or stored in a location remote from, yet accessible to storage node 400.

A write module 420 may also be implemented by storage node 400 to store the data for data blocks in the data blocks in storage 430. In at least some embodiments, write module 420 may be configured to sort the entries of the columnar relational database table according to the sort order values for each respective entry and direct the storage 430 to store the columnar relational database table according the sorted order. In some embodiments, write module 420 may be configured to update slab/block metadata 426 with other metadata for the data stored in the data block.

Storage node 400 may also receive queries 404, or indications of queries, such as queries for select data stored in storage 430. For example, a leader node, such as leader node 320 described above with regard to FIG. 3, may receive a query from a storage client, and generate a query execution plan which sends the query to a compute node implementing storage node 400. Storage node 400 may implement a query engine 440 to process and receive the queries. As discussed above queries may be instructions to be executed according to a query plan, but may also be more generally any type of request for data that meets a specified criterion or is generated by a specified process. In some embodiments, a query, or an indication of a query, may include one or more predicate data values that identify select data for processing the query. For example, an SQL query may include predicate data values that specify equality conditions to be met for data to be retrieved, such as "WHERE customer='small' AND customer='medium'." In some embodiments, there may different types of queries. Some types of queries may require filtering on point values (e.g., all records where the state value="Texas"). Other queries may request larger groups of data, such as range queries that filter data based on a range of data values (e.g., all purchase orders for with purchase prices between $1,000 and $10,000). Some queries may indicate data joins that join records from one table in database based on a corresponding value obtained from another database. (e.g., join the records from of a personal database that includes an indication of a particular work department with those records of employee personal information that include the same work department). The previous description of query engine 440 is not intended to be limiting as to the many different techniques and implementations of a query engine. For example, a standard query engine configured to process standard database protocol messages, such as SQL requests, may be implemented, or alternatively, a query engine that processes customized queries, such as those specified by an API may be used.

In some embodiments, therefore, a query engine 440 may receive an indication of a query 404 directed to one or more of the columns used to generate the sort order (including one or more columns used to determine a the sorting columns) for the columnar relational database table in storage 430 for particular data. Query engine 440 may evaluate the indication to determine Which storage locations to search for entries that may satisfy the query predicates. For example, distribution scheme value(s) may be determined for the query to determine which storage slabs might store items that satisfy the query predicates, then the identified storage slab(s) may be searched based on the query predicates. In some embodiments, additional optimizations, such as using slab/block metadata 426 to determine which data blocks or slabs store data that satisfies the query predicates using zone maps or other indications of data values stored within a data block or storage slab (which may be different than the distribution scheme values and ranges discussed above). Query engine 440 may then direct read module 450 to read the identified data blocks storing data for the columnar relational database table in order service the query.

In at least some embodiments, storage node 400 may include read module 450. Read module 450 may perform read operations to obtain data from storage 430. In some embodiments, read module 450 may be directed by query engine 440 to read certain data blocks for a column of the columnar relational database table and return the read data to query engine 440 for further processing. Query engine 440 may then provide at least some of the data in a query response 406 to a storage client, leader node, or other requesting system or device, or process, filter, manipulate, or otherwise change the data read from storage 430 in accordance with the received query. In at least some embodiments, read module 450 may also transfer data read from storage 430 to a database cache (not illustrated) or other module or device part that provides storage for more frequently accessed data when processing queries 404. Query engine 440 may then access the cache or other module with requesting new read operations of the read module 450. As a variety of different caching techniques for data management and storage systems may be implemented, the previous examples are not intended to be limiting.

Figure 5:
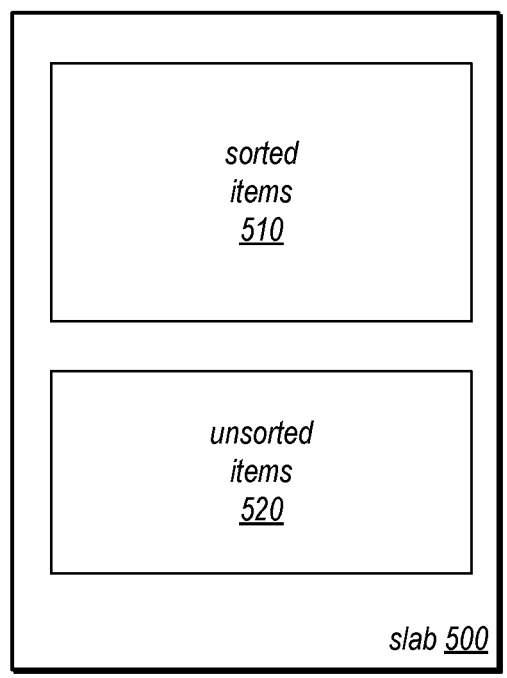
FIG. 5 is a block diagram illustrating an example storage slab assigned to nodes of a tree in a tree-based format, according to some embodiments.

FIG. 5 is a block diagram illustrating an example storage slab assigned to nodes of a tree in a tree-based format, according to some embodiments. Storage slab 500 may be a set of allocated or reserved storage locations on one or more storage devices implemented as part of a storage node. For example storage slab 500 may be a reserved number of data blocks, bytes, or bits of a block-based storage device, such as a hard disk drive or solid state drive. Storage slab 500 may be formatted to store items in two different regions, sorted items 510 and unsorted items 520. Sorted items 510 may be maintained so that zone mapping or other techniques may be implemented in place of or similar to indexing. For example, the min and max values of the column along which items are sorted may be maintained for each data block. Maintaining items in sorted order allows for faster processing for range queries. Because storage slabs still preserve the sorted order within a storage slab a different column or value of items may be used to map items to storage slabs for the distribution scheme than the sort order. Note that in some embodiments, sorted items 510 may include items that are sorted with respect to other items in the same data block but not sorted with respect to items in other data blocks. For example, two sorted data blocks may include overlapping items.

In order to more efficiently process requests to store additional items in a storage slab, unsorted items 520 may be maintained. Unsorted items 520 may be items stored but not yet sorted along with sorted items 510 in storage slab 500. In this way, a sortation operation does not have to be performed every time a new item is stored in the storage slab 500. Sortation operations may be later performed in the data store as part of a background process. A storage slab may be considered full (triggering the creation of new child storage slabs) when no further slots for storing items exist in the sorted item 510 and/or unsorted items 520. Once a storage slab is considered full, mapping information or other metadata describing storage slabs may mark the storage slab is full. Even if storage items are later deleted, no additional items may be stored in a storage slab identified as full, in some embodiments.

Figure 6:
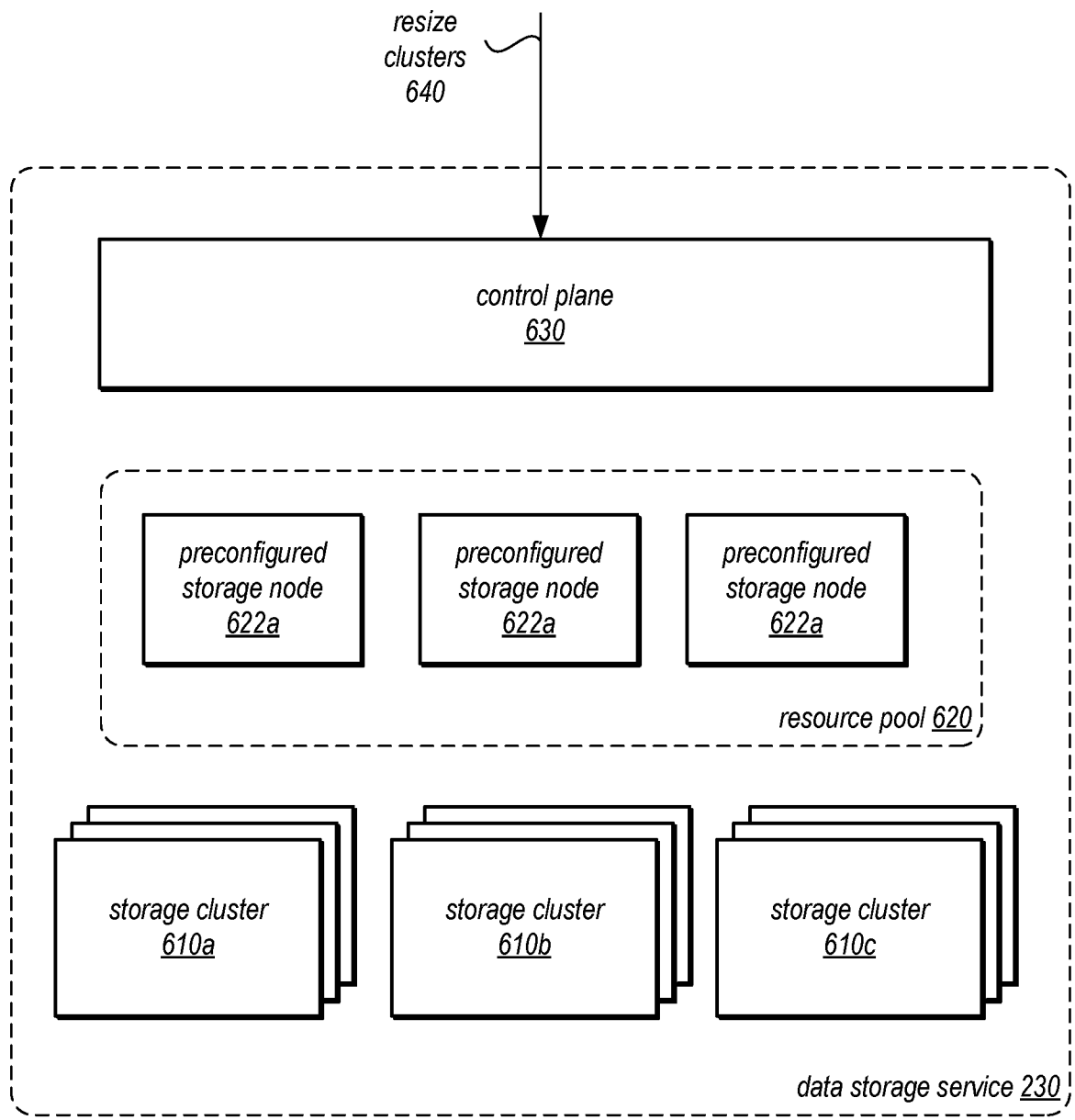
FIG. 6 is a block diagram illustrating a resource pool of preconfigured storage nodes for resizing storage clusters for a data storage service, according to some embodiments.

FIG. 6 is a block diagram illustrating a resource pool of preconfigured storage nodes for resizing storage clusters for a data storage service, according to some embodiments. In order to take advantage of the flexibility for changes in membership of a storage cluster that a tree format for data storage provides, some data storage services may implement a resource pool of preconfigured storage nodes in order to quickly provide additional storage nodes to a storage cluster if desirable. For example, data storage service 230 may implement resource pool 620 which implements various preconfigured storage nodes (e.g., preconfigured storage nodes 622a, 622b, and 622c) that may be assigned to storage clusters (e.g., storage clusters 610a, 610b, and 610c). Preconfigured storage nodes 622 may be may be configured to store data already stored at clusters 622 so that when one of storage nodes 622 is assigned, the storage node 622 may quickly join in the work of the storage cluster. The configuration of storage nodes 622 prior to assignment may include configuring networking, security, performance, storage engines or other options specific to a storage cluster. The network configuration of the storage nodes 622 may, for instance be setup to communicate with a client of the table with minimal final configuration to be performed after adding the storage nodes to the storage cluster. Similarly, security policies may be established or activated at the storage nodes 622 in order to enforce client specified or desired security features (e.g., to isolate data to certain users). Custom or client-specified storage engines for processing access requests may be installed or loaded at storage nodes 622. Some storage nodes 622 may be preconfigured in such a way as to be assignable to multiple different storage clusters, even if those storage clusters maintain different data on behalf of different clients of storage service 230.

Data storage service 230 may implement control plane 610 to process requests 640 to resize storage clusters. Note that some storage resize requests, to add or remove nodes as discussed below with regard to FIGS. 9 and 10, may be received from clients, whereas other requests may be triggered by internal components, such as a monitoring component of control plane 610 that triggers automated scaling of storage clusters in different conditions. Control plane 610 may direct various operations including the provision of additional storage nodes, the selection of storage nodes to remove from a storage cluster, the redistribution or mapping of storage slabs to a modified storage cluster, and/or any other resize operation.

Figure 7:
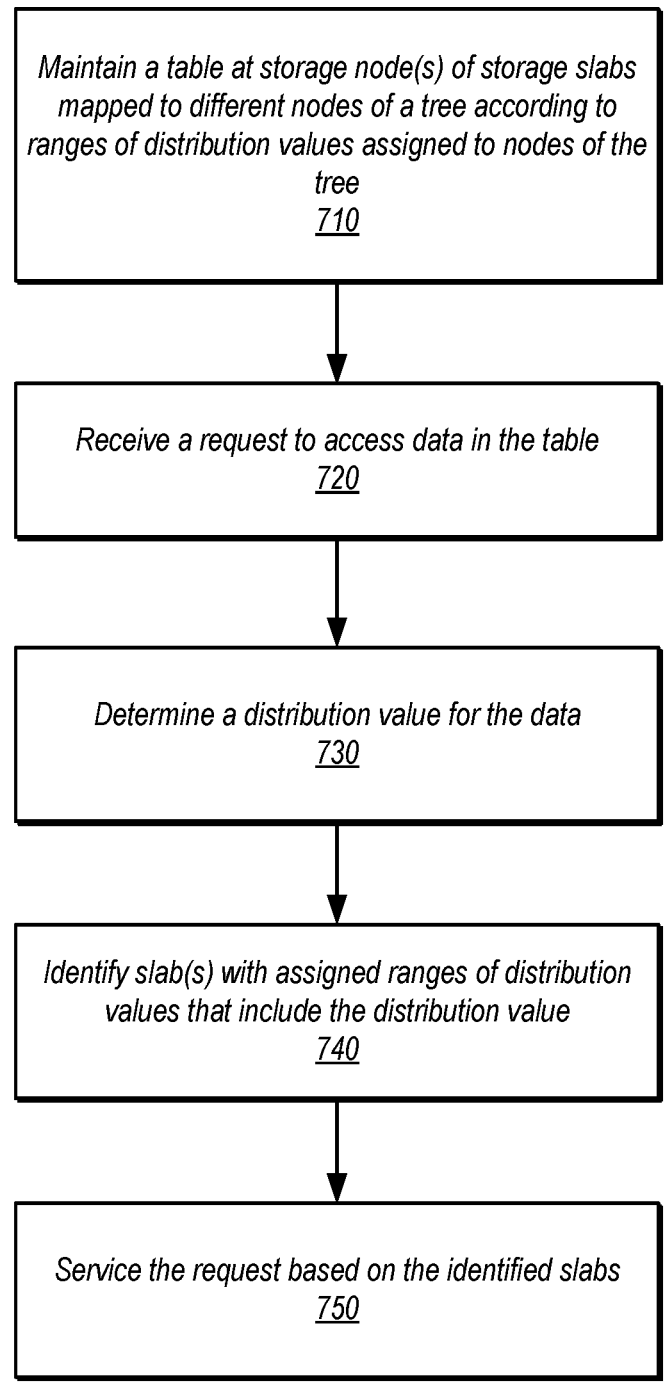
FIG. 7 is a high-level flowchart illustrating methods and techniques to provide access to data maintained in a tree-based format in a data store, according to some embodiments.

Although FIGS. 2-6 have been described and illustrated in the context of a data storage service, like a data warehousing system implementing a columnar relational database table, the various components illustrated and described in FIGS. 2-6 may be easily applied to other data management systems that provide data management and/or storage services for a table of items, which may include various other data formats, such as a row-oriented relational database or non-relational database tables. As such, FIGS. 2-6 are not intended to be limiting as to other embodiments of a storage cluster. FIG. 7 is a high-level flowchart illustrating methods and techniques to provide access to data maintained in a tree-based format in a data store, according to some embodiments. Various different systems and devices may implement the various methods and techniques described below, either singly or working together. For example, a storage cluster, such as described above with regard to FIGS. 3-6 may be configured to implement the various methods. Alternatively, a combination of different systems and devices. Therefore, the above examples and or any other systems or devices referenced as performing the illustrated method, are not intended to be limiting as to other different components, modules, systems, or configurations of systems and devices.

As indicated at 710, a table may be maintained at storage node(s) in storage slabs mapped to different nodes of a tree according to ranges of distribution values assigned to nodes of the tree. As discussed above with regard to FIG. 1, a tree may be mapped to different storage slabs so that the storage slabs mapped to child nodes in the tree may inherit part of the range of distribution values assigned to the parent and other ancestor nodes in the tree. In this way when searching for data in the tree with a particular distribution values, the storage slabs where the data may be present is equal to the depth of the tree. For instance, if a tree like the tree illustrated in FIG. 1, has 3 levels, then at most 3 storage slabs may have to be searched for an item.

Consider the following example. As indicated at 720, a request to access the data in the table may be received. The request may be formatted according to various querying languages or formats (e.g., structured query language (SQL)). In response to receiving the request, a distribution value may be determined for the data, as indicated at 730. If, for instance, a hashing scheme is implemented as the distribution scheme, then a hash function may be applied to particular value, key, field, or other portion or combination of portions of the data to determine the distribution value. Storage slab(s) with assigned ranges of distribution values that include the distribution value may be identified, as indicated at 740. For example, mapping information or other data that describes the assigned ranges of distribution values may be compared with the determined distribution value. Because the storage slabs inherit a portion of the assigned range of distribution values of the parent, identified storage slabs may always include the storage slab mapped to the root node and one storage slab in each level of the tree until a leaf node is reach that has a range including the determined distribution value. Note that as some portions of a tree may be deeper than other portions of the tree, some access requests may identify different numbers of storage slabs to evaluate than others.

Figure 8:
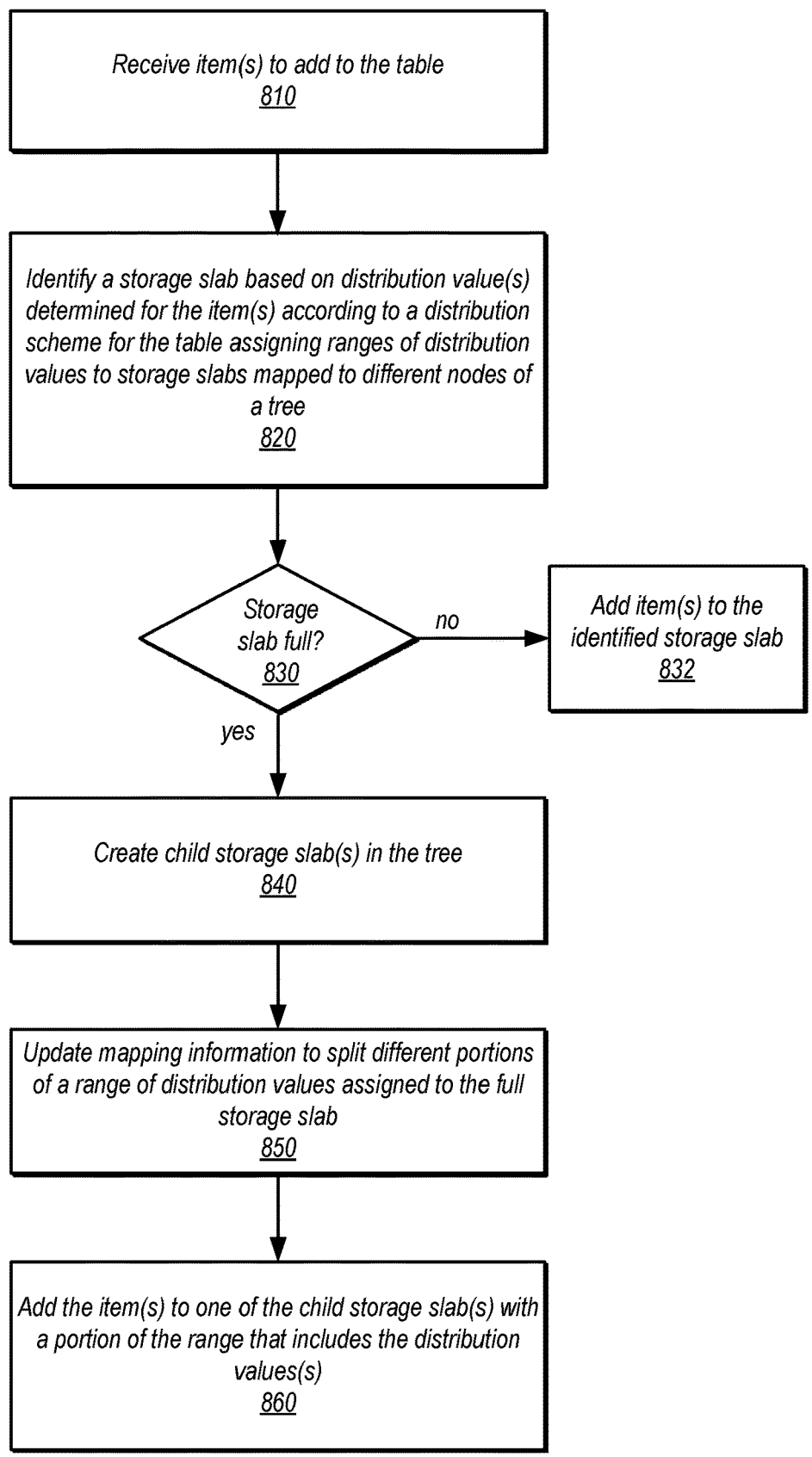
FIG. 8 is a high-level flowchart illustrating methods and techniques to add data to table stored in a tree-based format, according to some embodiments.

As the amount of data stored in the table grows, the tree may grow correspondingly while maintaining the mapping of new storage slabs to new leaf nodes in the tree. FIG. 8 is a high-level flowchart illustrating methods and techniques to add data to table stored in a tree-based format, according to some embodiments. As indicated at 810, item(s) may be received to be stored in the table. For instance, a number of rows may be sent to the data store to be added to the table. Distribution values may be determined for the items according to the distribution scheme. A hash function may be applied, for instance, to the value of a column in the rows to determine respective hash values for the rows. Storage slab(s) with assigned ranges of distribution values that include the distribution values for the item(s) may be identified, as indicated at 820. For example, mapping information describing the distribution value ranges for storage slabs may be evaluated. The mapping information may also identify the depth or level of the storage slabs in the tree. In at least some embodiments, the lowest depth or level of storage slab assigned a range of distribution values that includes the distribution value(s) may be identified (e.g., as higher level storage slabs with assigned ranges of distribution value(s) that include the distribution value(s) for the item(s) are inherently already full).

If the identified storage slab(s) have capacity to store the item(s), then as indicated by the negative exit from 830, the items may be stored in the identified storage slabs. However, if the identified storage slab(s) are full and unable to store the item(s), then as indicated by the positive exit from 830, storage slabs mapped to new child nodes of the identified storage slab may be created, as shown in 840. For instance, storage capacity in storage devices (e.g., hard disk drives) may be allocated, configured, or otherwise reserved for the new storage slabs. In some embodiments, the storage slabs may be formatted (e.g., by creating initial metadata structures and/or other information for storing items). A discussed above with regard to FIG. 1, the number of additional storage slabs created may be indicated by a predetermined number (e.g., 16 new storage slabs). The child storage slabs may be assigned to storage nodes according to a same assignment scheme as previously created storage slabs for the table (e.g., a consistent hashing scheme as discussed above). As indicated at 850, mapping information may be updated to split different portions of the range of distribution values assigned to the full storage slab (e.g., mapped to the parent node of the newly created leaf nodes mapped to the new storage slabs). In this way, the entire range of distribution values covered by the full storage slab may be covered by all of the new storage slabs. As indicated at 860, the item(s) may be added to or stored in one of the child storage slab(s) with an assigned portion of the range of distribution values that includes the distribution values.

Figure 9:
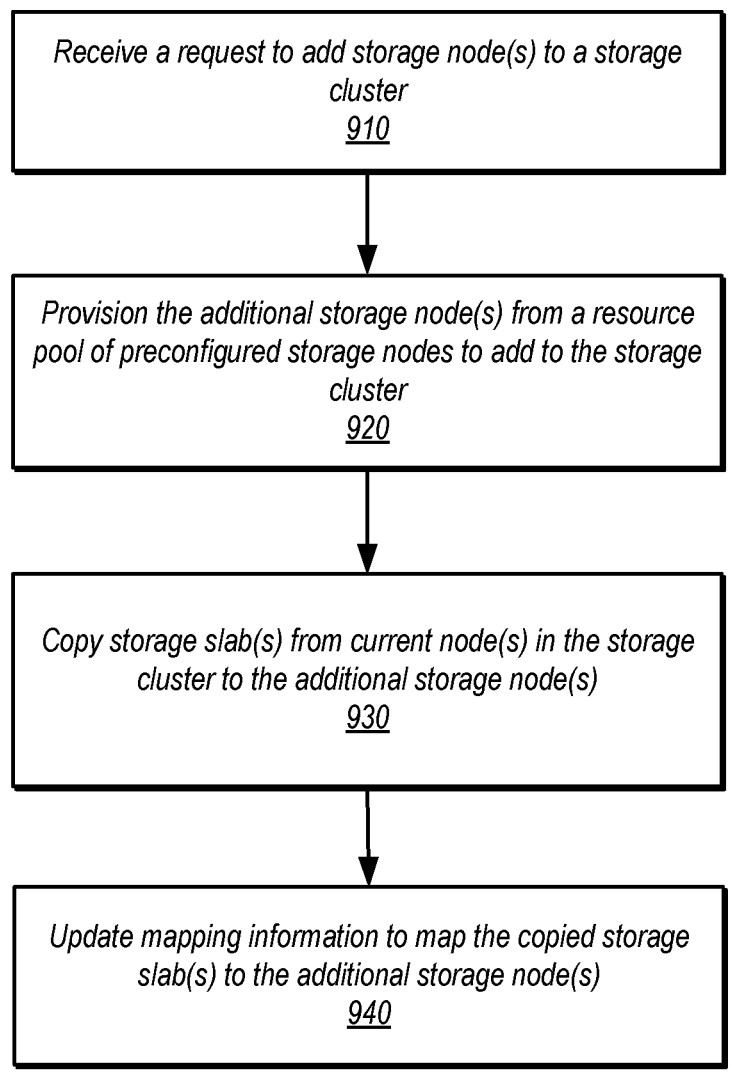
FIG. 9 is a high-level flowchart illustrating methods and techniques to add storage nodes to a storage cluster implementing a tree-based storage format from a resource pool, according to some embodiments.

The type of access or utilization of data stored in a data store may change over time. The ability to change the number of storage nodes that maintain the data may provide a way to adapt to the change in type or utilization of data. Increasing or adding storage nodes a storage cluster may, for instance, parallelize the workload to process certain queries, which may increase the performance of processing the query. FIG. 9 is a high-level flowchart illustrating methods and techniques to add storage nodes to a storage cluster implementing a tree-based storage format from a resource pool, according to some embodiments.

As indicated at 910, a request to remove storage nodes from a storage cluster may be received, in some embodiments. For example, a network-based interface (e.g., a programmatic interface like an API or a command-line interface) may be implemented that receives a request to add a specified number of storage nodes from a client. In some embodiments, the request may specify particular types storage nodes to add (e.g., storage nodes with X storage capacity, Y processing capacity, or Z throughput capacity). In some cases, a control plane or other resource manager may identify the type of storage nodes to add to achieve certain performance characteristics for the storage cluster automatically.

As indicated at 920, the additional storage nodes may be provisioned from a resource pool of preconfigured storage nodes to add to the storage cluster. For example, as discussed above with regard to FIG. 6, a resource pool of additional storage node resources (e.g., services, storage devices, or other computing resources) may be configured to store the table on behalf of a client. The network configuration of the storage nodes may, for instance be setup to communicate with a client of the table with minimal final configuration to be performed after adding the storage nodes to the storage cluster. Similarly, security policies may be established or activated at the storage nodes in order to enforce client specified or desired security features (e.g., to isolate data to certain users). Custom or client-specified storage engines for processing access requests may be installed or loaded. Capacity information or tracking information may be updated to identify selected storage nodes from the resource pool as unavailable.

As indicated at 930, storage slab(s) may be copied from current storage cluster node(s) to the additional storage node(s), in some embodiments. Transfer operations or requests may be initiated by a control plane or leader node for the storage cluster directing the current storage cluster node(s) to transfer specified storage slabs. The storage slabs may be selected based on an assignment scheme for assigning storage slabs to storage nodes, as discussed above. For example, in an assignment scheme that assigns storage slabs with contiguous ranges of distribution values to the same storage node may copy storage nodes with contiguous ranges of distribution values from one or more of the current storage nodes to the additional storage node(s).

As indicated at 940, mapping information may be updated to map the copied storage slab(s) to the additional node(s). For instance, storage slab metadata or other information may be modified to map identifiers for the copied storage slabs with identifiers of the additional storage nodes. Once mapping information is updated, storage nodes that copied the storage slabs may complete processing of received and/or inflight access requests and may refuse subsequent access requests directed toward the copied storage slabs. Note that in some embodiments, various ones of the illustrated elements may be performed in parallel or a different ordering. For example, storage slab(s) may be copied, as indicated at 930, after mapping information is updated and requests are already being directed to the additional storage nodes (e.g., copying data from the storage slab(s) to the additional storage node(s) as needed to service a request). In some embodiments, the storage slab(s) may be copied from an archive or other backup store instead of the current storage node(s).

Figure 10:
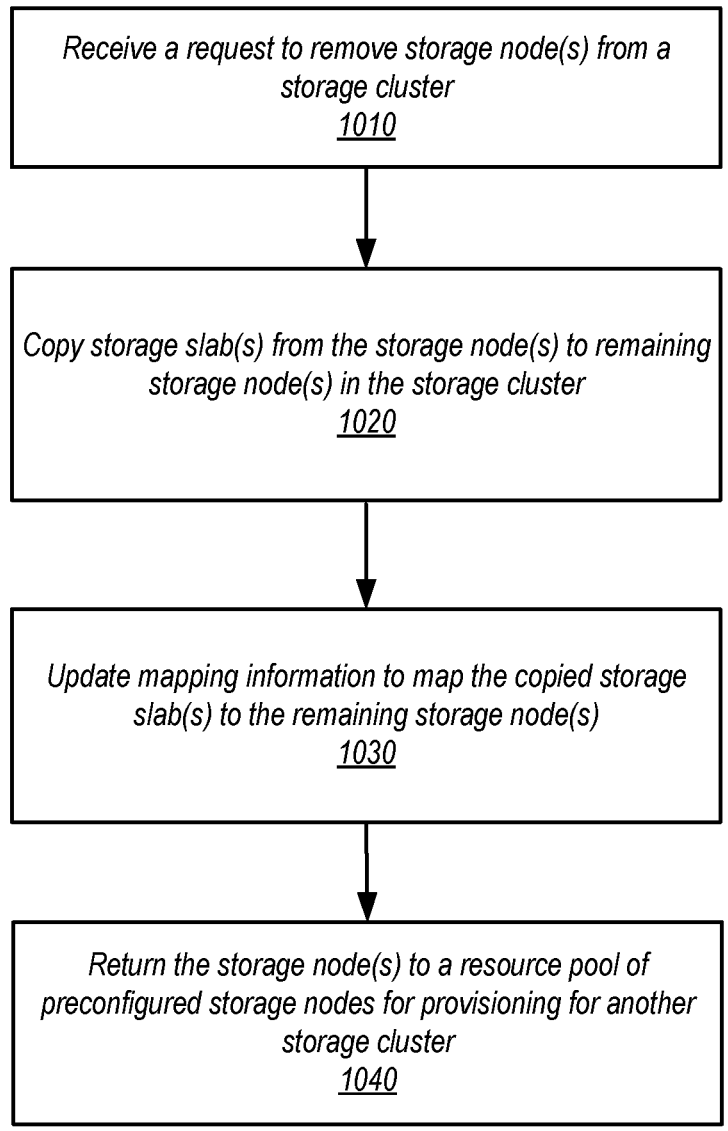
FIG. 10 is a high-level flowchart illustrating methods and techniques to remove storage nodes to a storage cluster implementing a tree-based storage format, according to some embodiments.

Similar to the addition of storage nodes to increase the processing capacity for accessing data, storage nodes may be removed in order to size a cluster of storage nodes maintaining in a cost or other resource efficient manner. By storing data of the table in storage slabs, the storage slabs themselves may be copied or otherwise moved from one storage node to another in order to account for changes in storage cluster membership. FIG. 10 is a high-level flowchart illustrating methods and to remove storage nodes to a storage cluster implementing a tree-based storage format, according to some embodiments.

As indicated at 1010, a request to remove storage nodes from a storage cluster may be received, in some embodiments. For example, a network-based interface (e.g., a programmatic interface like an API or a command-line interface) may be implemented that receives a request to remove a specified number of storage nodes from a client. In some embodiments, the request may specify particular ones of the storage nodes to remove (or may leave the storage nodes to remove unspecified). For example, a control plane or other resource manager may identify the storage nodes to remove that result in the least movement of slabs or other work to remove the storage nodes automatically.

In response to receiving the request, the storage slab(s) at the storage node(s) to be removed may be copied from the storage node(s) to be removed to remaining storage node(s). For example, the assignment scheme for assigning storage slabs to storage nodes may be used to identify the destination of storage slabs being copied. Consider the consistent hashing scheme discussed above. Hash values may be generated for the storage slabs to be moved based on hash values assigned to the remaining storage nodes (e.g., removed storage nodes may have hash value ranges absorbed by storage nodes with adjacent hash value ranges). The identified remaining storage node(s) may receive (or initiate) transfer of the storage slab(s).

As indicated at 1030, mapping information may be updated to map the copied storage slab(s) to the remaining storage node(s), in some embodiments. For instance, storage slab metadata or other information may be modified to map identifiers for the storage slabs with identifiers of the remaining storage nodes. Once mapping information is updated, storage nodes to be removed may complete processing of received and/or inflight access requests and may refuse subsequent access requests directed toward the table. As indicated at 1040, the storage node(s) may then be returned to the resource pool of preconfigured storage nodes for provisioning for another storage cluster (or the same storage cluster at a later time). For example, resource pool capacity information or tracking information may be updated to indicate that the returned storage nodes are available for reassignment. The storage nodes may be reconfigured or modified to prepare for a different assignment (e.g., updating networking configuration, security configuration, software or other programs executing on the storage nodes).

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 11:
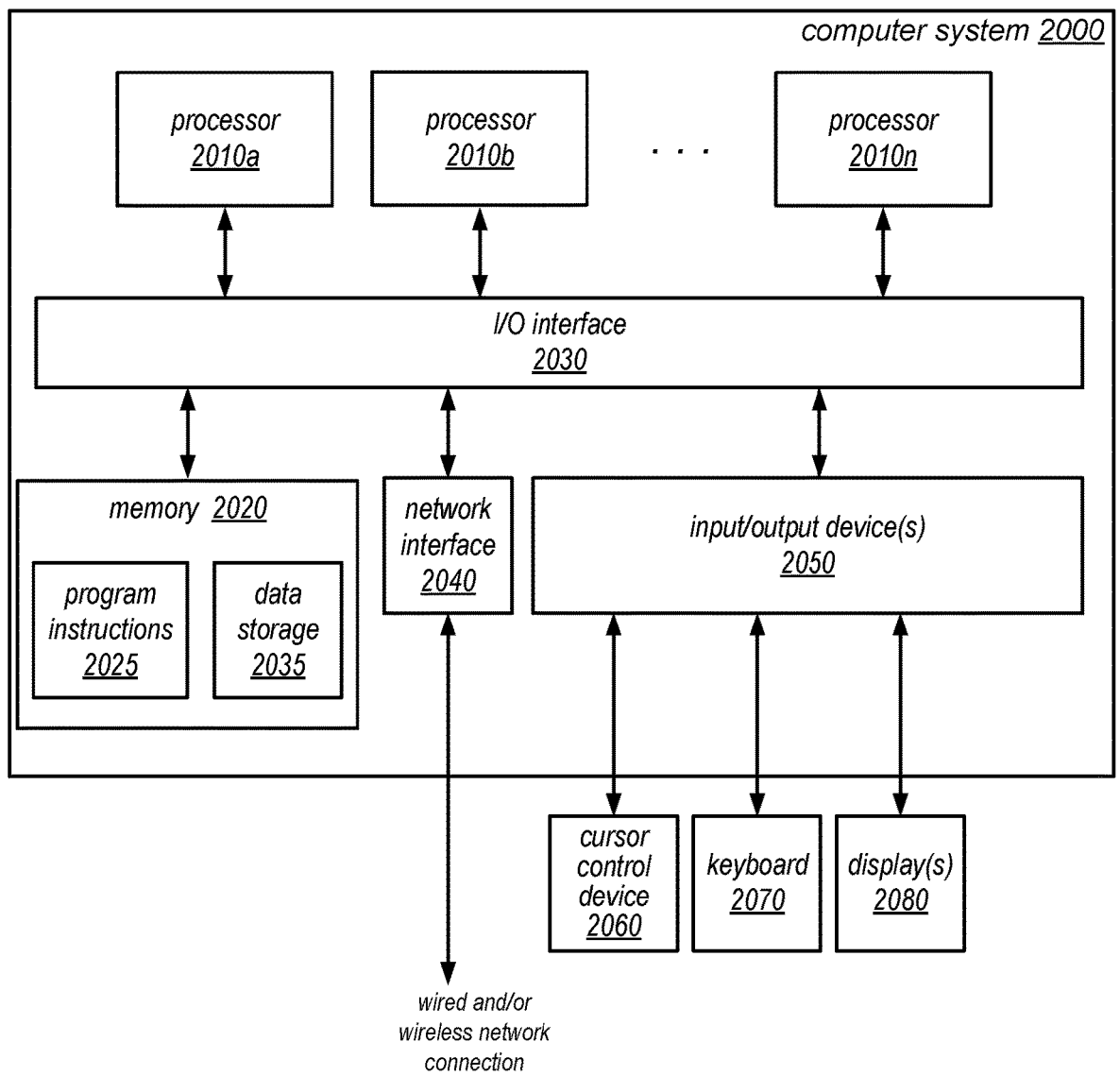
FIG. 11 illustrates an example system configured to implement the various methods, techniques, and systems described herein, according to some embodiments.

Embodiments of tree-based format for data storage as described herein may be executed on one or more computer systems, which may interact with various other devices. One such computer system is illustrated by FIG. 11. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may be configured to host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may be configured to store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 11, memory 2020 may include program instructions 2025, configured to implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a plurality of storage hosts, each comprising at least one processor, a memory, and a storage device, collectively implementing a data store configured to:
host one or more of a plurality of storage slabs at individual ones of the plurality of storage hosts;
store a plurality of items of a table in the plurality of storage slabs, wherein a distribution scheme distributes the plurality of items of the table among the storage slabs according to ranges of distribution values assigned to a plurality of nodes of a tree, and wherein individual ones of the plurality of storage slabs store a respective at least one item of the table; and
map individual ones of the plurality of storage slabs to different ones of the plurality of nodes of the tree, the plurality of nodes comprising multiple parent nodes and multiple child nodes, wherein respective ones of a portion of the plurality of storage slabs are mapped to respective ones of the multiple parent nodes, wherein individual ones of the multiple child nodes are assigned a respective parent node and at least a portion of the range of distribution values assigned to the respective parent node, and wherein a particular storage slab mapped to a particular parent node is hosted at respective storage hosts also hosting storage slabs mapped to the respective child nodes of the particular parent node;
service a query directed to the table, wherein, to service the query, the data store is configured to:
determine a distribution value for servicing the query;
identify one or more storage slabs of the plurality of storage slabs with assigned ranges of distribution values that include the distribution value; and
access the identified one or more storage slabs to service the query; and
add an item to the table storing the plurality of items, wherein, to add the item, the data store is configured to:
determine that a storage slab, of the storage slabs, with an assigned range of distribution values that includes a distribution value determined for the item has no capacity to store the item, and responsive to the determining:

create one or more additional storage slabs mapped to respective child nodes of the identified storage slab in the tree;
split the range of distribution values to assign different portions of the range of distribution values among the additional storage slabs; and
add the item to one of the additional storage slabs with a portion of the range of distribution values that includes the distribution value determined for the item.

2. The system of claim 1, wherein the system further comprises a leader node for the storage hosts, comprising at least one processor and a memory, wherein the leader node is configured to assign the plurality of storage slabs to the storage hosts according to a consistent hashing scheme.

3. The system of claim 1, further comprising one or more nodes, respectively comprising a processor and a memory that together implement a control plane for the data store, wherein the control plane is configured to:
provision one or more additional storage hosts to add to the storage hosts storing the table; and
direct movement of one or more storage slabs from the storage hosts to the one or more additional storage hosts.

4. The system of claim 1, wherein the data store is a network-based data warehouse service that stores the table on behalf of a client of the data warehouse service, wherein the data is stored in the storage slabs on the respective storage devices of the storage hosts in column-oriented fashion.

5. A method, comprising:
performing, by a data store comprising a plurality of storage hosts, each comprising at least one processor, a memory, and a storage device:
hosting, at individual ones of the plurality of storage hosts, one or more of a plurality of storage slabs;
maintaining a plurality of items of a table in the plurality of storage slabs, wherein a distribution scheme distributes the table among the slabs according to ranges of distribution values assigned to a plurality of nodes of a tree, and wherein individual ones of the plurality of storage slabs store a respective at least one item of the table; and
mapping individual ones of the plurality of storage slabs to different ones of the plurality of nodes of the tree, the plurality of nodes comprising multiple parent nodes and multiple child nodes, wherein respective ones of a portion of the plurality of storage slabs are mapped to respective ones of the multiple parent nodes, wherein individual ones of the multiple child nodes are assigned a respective parent node and at least a portion of the range of distribution values assigned to the respective parent node; and wherein a particular storage slab mapped to a particular parent node is hosted at respective storage hosts also hosting storage slabs mapped to the child nodes of the particular parent node;
receiving a request to access data in the table;
in response to receiving the request:
determining a distribution value for the data;
identifying one or more storage slabs of the plurality of storage slabs with assigned ranges of distribution values that include the distribution value; and
servicing the request based on the identified one or more storage slabs; and
adding an item to the table maintaining the plurality of items, comprising:
determining that a storage slab, of the storage slabs, with an assigned range of distribution values that includes a distribution value determined for the item has no capacity to store the item, and responsive to the determining:
creating one or more additional storage slabs mapped to respective child nodes of the identified storage slab in the tree;
splitting the range of distribution values to assign different portions of the range of distribution values among the additional storage slabs; and
adding the item to one of the additional storage slabs with a portion of the range of distribution values that includes the distribution value determined for the item.

6. The method of claim 5, wherein maintaining the table at the plurality of storage hosts of the plurality of storage slabs mapped to different nodes of the tree comprises assigning the plurality of storage slabs to the plurality of storage hosts according to a consistent hashing scheme.

7. The method of claim 5, wherein storage slabs that are mapped to ancestor nodes of a storage slab in the tree are maintained at a same one of the plurality of storage hosts as the storage slab.

8. The method of claim 5, wherein at least one of the storage slabs allocates storage for a different number of items of the table than another one of the storage slabs.

9. The method of claim 5, further comprising:
prior to maintaining the table at the plurality of storage hosts in the plurality of storage slabs mapped to different nodes of the tree:
receiving the table for storage in a different data format; and
converting the table from the different data format to store the table in the storage slabs.

10. The method of claim 5, further comprising:
adding one or more additional storage hosts to the plurality of storage hosts maintaining the table; and
copying one or more storage slabs from the plurality of storage hosts to the one or more additional storage hosts.

11. The method of claim 10, further comprising maintaining a resource pool of preconfigured storage hosts for storing the table, wherein the one or more additional storage hosts are added from the resource pool of preconfigured storage hosts.

12. The method of claim 10, further comprising:
receiving a request to add the one or more additional storage hosts via a network-based interface for the data store from a client of the data store; and
in response to receiving the request, performing the adding and the copying.

13. A non-transitory, computer-readable storage medium, storing program instructions that when executed by one or more computing devices cause the one or more computing devices to implement:
receiving a table for storage in a data store;
storing a plurality of items of the table in a plurality of storage slabs, wherein a respective one or more of the plurality of storage slabs is hosted at individual ones of a plurality of storage hosts of the data store, wherein a distribution scheme distributes the plurality of items of the table among the storage slabs according to ranges of distribution values assigned to nodes of a tree, and wherein individual ones of the plurality of storage slabs store a respective at least one item of the table;

mapping individual ones of the plurality of storage slabs to different ones of the plurality of nodes of the tree, the plurality of nodes comprising multiple parent nodes and multiple child nodes, wherein respective ones of a portion of the plurality of storage slabs are mapped to respective ones of the multiple parent nodes, wherein individual ones of the multiple child nodes are assigned a respective parent node and at least a portion of the range of distribution values assigned to the respective parent node, and wherein a particular storage slab mapped to a particular parent node is hosted at respective storage hosts also hosting storage slabs mapped to the child nodes of the particular parent node;

servicing a request to access an item of the table, wherein, in servicing the request to access the item of the table the program instructions cause the one or more computing devices to implement:

determining a distribution value for the item;

identifying one or more storage slabs of the plurality of storage slabs with assigned ranges of distribution values that include the distribution value; and accessing the identified one or more storage slabs to service the request; and adding an item to the table maintaining the plurality of items, wherein, in adding the item to the table the program instructions cause the one or more computing devices to implement:

determining that a storage slab, of the storage slabs, with an assigned range of distribution values that includes a distribution value determined for the item has no capacity to store the item, and responsive to the determining:

creating one or more additional storage slabs mapped to respective child nodes of the identified storage slab in the tree;

splitting the range of distribution values to assign different portions of the range of distribution values among the additional storage slabs; and adding the item to one of the additional storage slabs with a portion of the range of distribution values that includes the distribution value determined for the item.

14. The non-transitory, computer-readable storage medium of claim 13, wherein, in storing the table in the plurality of storage slabs mapped to different nodes of the tree at the plurality of storage hosts of the data store, the program instructions cause the one or more computing devices to implement assigning the plurality of storage slabs to the plurality of storage hosts according to a consistent hashing scheme.

15. The non-transitory, computer-readable storage medium of claim 13, wherein items of the table are stored in the plurality of storage slabs according to a sort order.

16. The non-transitory, computer-readable storage medium of claim 13, wherein the distribution scheme comprises a hash function applied to values in a column of the table to determine respective distribution values for rows of the table, wherein the rows of the table are stored in respective ones of the storage slabs with assigned ranges that include the respective distribution values.

17. The non-transitory, computer-readable storage medium of claim 13, wherein the program instructions cause the one or more computing devices to further implement:

receiving a request to remove a storage host from the plurality of storage hosts storing the table;

in response to receiving the request to remove the storage host, copying one or more storage slabs from the storage host to be removed to one or more remaining storage hosts.

18. The non-transitory, computer-readable storage medium of claim 17, wherein the program instructions cause the one or more computing devices to further implement returning the storage host to be removed to a resource pool of preconfigured storage hosts for storing the table.

* * * * *